Patented Sept. 6, 1938

UNITED STATES PATENT OFFICE

2,128,975

ARALKYL ETHERS OF THE HYDROXY-BENZOATES

Edward M. Van Duzee and Shailer L. Bass, Midland, Mich., assignors to The Dow Chemical Company, Midland, Mich., a corporation of Michigan No Drawing. Application August 21, 1936,
Serial No. 97,228

17 Claims. (Cl. 260—104)

The present invention concerns a new class of compounds, namely, the aralkyl ethers of certain hydroxy-substituted benzoic acid esters and derivatives of said esters substituted with a phenyl, methyl, or halogen substituent in the hydroxylated benzene ring. The compounds with which this application is particularly concerned have the following structural formula

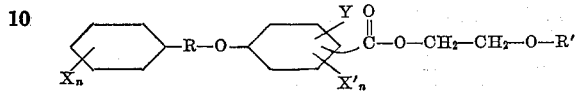

wherein X and X' each represents halogen or hydrogen, $n$ is an integer not greater than 2, R represents an alkylene radical, R' is a hydrocarbon group selected from the class consisting of the alkyl, aralkyl, cyclo-alkyl, and aryl radicals, and Y is phenyl, methyl, or hydrogen.

We have prepared compounds of the aforementioned class, determined certain physical properties thereof, whereby they may be readily identified, and found that they are particularly useful as intermediates for the manufacture of pharmaceuticals, as lubricant addition agents, and as plasticizing agents for cellulose derivatives, such as ethyl cellulose, cellulose acetate, etc. The invention, then, lies in the new products hereinafter fully described and particularly pointed out in the claims.

The new compounds can be prepared by treating the alkali-metal salt of a suitable hydroxy-substituted benzoic acid ester compound directly with an aralkyl halide.

For example, a hydroxy-substituted benzoic acid ester compound, such as an alkyloxy-ethyl hydroxy-benzoate, is added to an alcoholic solution of metallic sodium, thereby producing an alcoholic solution of the sodium salt of said hydroxy-benzoate. An aralkyl halide is then introduced slowly into such sodium oxy-benzoate solution maintained at its refluxing temperature to form the desired ether product. The reaction mixture is then cooled and diluted with several volumes of water to precipitate a crude ether product which may be recovered in any convenient manner, such as by extraction with an organic solvent, decantation, etc. The crude product so obtained is washed with water and purified, as by distillation or fractional crystallization, to obtain the desired ether in substantially pure form.

Other methods by which our new compounds may be obtained are: (1) by reacting a suitable hydroxy-substituted benzoic acid ester compound with an aralkyl halide in the presence of an aqueous or aqueous alcoholic solution of sodium hydroxide or other suitable alkali, (2) by esterifying the aralkyl ether of a hydroxy-benzoic acid with a mono-ether of ethylene glycol, or (3) by reacting upon a hydroxy-ethyl ester of a hydroxy-benzoic acid with a suitable aralkyl halide or alkyl halide-aralkyl halide mixture.

The following examples describe in detail the preparation of certain specific members of our new class of compounds but are offered only to illustrate the invention and are not to be construed as limiting the same.

Example 1

23 grams (1 mol.) of metallic sodium was digested with 500 milliliters of absolute alcohol, and 210 grams of beta-ethoxy-ethyl salicylate was reacted with the resulting alcoholate solution to form an alcoholic solution of the sodium salt of said hydroxy-benzoic acid ester. This solution was warmed to its refluxing temperature and 126.5 grams (1 mol.) of benzyl chloride added thereto over a period of 1 hour. Refluxing was continued thereafter for 1 hour under atmospheric pressure, after which the reaction mixture was cooled and diluted with approximately 3 volumes of water. An oil insoluble in alkali separated out of the aqueous alcoholic suspension and was extracted therefrom with benzene. The extract was washed with water to remove suspended sodium chloride, filtered, and the benzene removed by distillation at atmospheric pressure. The dark viscous residue obtained thereby was fractionally distilled under reduced pressure. 135 grams (0.45 mol.) of the benzyl ether of beta-ethoxy-ethyl salicylate was thereby obtained as a water-white liquid boiling between 189° and 195° C. at 4 millimeters pressure and having a specific gravity of 1.133 at 20°/4° C.

Example 2

In a similar manner 11.4 grams (0.498 mol.) of metallic sodium, 111.5 grams (0.498 mol.) of beta-ethoxy-ethyl 3-methyl salicylate, i. e., the beta-ethoxy-ethyl ester of ortho-cresotinic acid, and 62.9 grams (0.498 mol.) of benzyl chloride were reacted together in 500 milliliters of alcohol and the crude reaction product resulting therefrom extracted with benzene and purified by fractional distillation. 55 grams (0.175 mol.) of the benzyl ether of beta-ethoxy-ethyl 3-methyl-salicylate was obtained thereby as a water-white liquid boiling between 180° and 185° C. at 3 millimeters pressure and having a specific gravity of 1.119 at 20°/4° C.

Example 3

119 grams (0.5 mol.) of beta-n-butoxy-ethyl salicylate, 63.3 grams (0.5 mol.) of benzyl chloride, and 11.5 grams (0.5 mol.) of metallic sodium were reacted together in alcohol substantially as described in Example 1. 62.5 grams (0.191 mol.) of the benzyl ether of beta-n-butoxy-ethyl salicylate was isolated from the reaction product as a yellow-tinged liquid boiling between 173° and 177° C. at 2 millimeters pressure and having a specific gravity of 1,134 at 20°/4° C.

*Example 4*

The reaction of 3.16 grams (0.25 mol.) of benzyl chloride, 72 grams (0.25 mol.) of beta-ethoxy-ethyl 5-bromo-salicylate and 5.75 grams (0.25 mol.) of metallic sodium in alcohol in the manner described in Example 1 resulted in the formation and isolation of 40.1 grams (0.106 mol.) of the benzyl ether of beta-ethoxy-ethyl 5-bromo-salicylate as a white solid boiling at 194° to 198° C. at 2 millimeters pressure and freezing at 25.5° C.

*Example 5*

11.5 grams (0.5 mol.) of metallic sodium, 129 grams (0.5 mol.) of beta-phenoxy-ethyl salicylate and 63.5 grams (0.5 mol.) of benzyl chloride were reacted together in 550 milliliters of alcohol substantially as described in Example 1. The crude reaction product was extracted with benzene and the desired ether-ester product isolated by fractional distillation, thereby obtaining 65.4 grams (0.187 mol.) of the benzyl ether of beta-phenoxy-ethyl salicylate as a water-white liquid boiling between 170° and 175° C. at 2 millimeters pressure and having the specific gravity 1.132 at 20°/4° C.

*Example 6*

80.5 grams (0.5 mol.) of 4-chloro-benzyl chloride was reacted with a solution of 0.5 mol. of the sodium salt of beta-n-butoxy-ethyl salicylate in 250 milliliters of alcohol, whereby there was obtained, upon purification of the crude reaction product as described in Example 1, 79 grams (0.218 mol.) of the 4-chloro-benzyl ether of beta-n-butoxy-ethyl salicylate as a water-white liquid boiling between 190° and 195° C. at 2 millimeters pressure and having a specific gravity of 1.127 at 20°/4° C.

*Example 7*

In a similar manner 11.5 grams (0.5 mol.) of metallic sodium, 105 grams (0.5 mol.) of beta-ethoxy-ethyl salicylate and 80.5 grams (0.5 mol.) of 4-chloro-benzyl chloride were reacted together, the major product of reaction being 4-chloro-benzyl ether of beta-ethoxy-ethyl salicylate, 77.3 grams (0.231 mol.) of which was isolated as a water-white liquid boiling between 188° and 193° C. at 2 millimeters pressure and having the specific gravity 1.217 at 20°/4° C.

*Example 8*

14.3 grams (0.623 mol.) of metallic sodium was dissolved in 400 milliliters of absolute alcohol and reacted with 131 grams (0.623 mol.) of beta-ethoxy-ethyl salicylate and 115 grams (0.623 mol.) of beta-phenyl-ethyl bromide substantially as described in Example 1. The crude reaction mixture was extracted with benzene, washed with water, filtered, dried, and the benzene solution fractionally distilled. 31.8 grams (0.101 mol.) of the beta-phenyl-ethyl ether of beta-ethoxy-ethyl salicylate was isolated therefrom as a yellow-tinged liquid boiling between 174° and 178° C. at 2 millimeters pressure and having a specific gravity of 1.111 at 20°/4° C.

Other aralkyl halides and particularly those in which the alkyl residue contains from 1 to 8 carbon atoms, inclusive, may be substituted for those employed in the foregoing examples and reacted with salicylate compounds to produce compounds such as phenyl-octyl-ether of beta-ethoxy-ethyl 5-chloro-salicylate, 2-chloro-phenyl-amyl ether of beta-ethoxy-ethyl 3.5-dichloro salicylate, 2.4-dibromo-benzyl ether of beta-xenoxy-ethyl salicylate, 4-iodo-benzyl ether of beta-(alpha-naphthoxy)-ethyl salicylate, phenyl-butyl-ether of beta-cyclohexyloxy-ethyl salicylate, phenyl-propyl ether of beta-benzyloxy-ethyl salicylate and benzyl ether of beta-ethoxy-ethyl 3-phenyl salicylate.

By substituting the corresponding esters of 3- and 4-hydroxy-benzoic acids for the salicylic acid esters in the foregoing examples the corresponding aralkyl ethers of the 3- and 4-hydroxy-benzoates may be prepared. For example, benzyl ether of beta-butoxy-ethyl 4-hydroxy-benzoate, 4-bromo-benzyl ether of beta-ethoxy-ethyl 3-chloro-4-hydroxy-benzoate, beta-phenyl-ethyl-ester of beta-ethoxy-ethyl 4-hydroxy-benzoate, benzyl ether of beta-ethoxy-ethyl 3-hydroxy-benzoate, etc. In place of the sodium salts employed in the examples, other alcohol-soluble salts of hydroxy-benzoate derivatives may be employed. e. g. the potassium compounds, etc.

Other modes of applying the principle of our invention may be employed instead of those explained, change being made as regards the materials employed, provided the products described in the following claims be thereby obtained.

We therefore particularly point out and distinctly claim as our invention:—

1. An aralkyl ether of a hydroxy-substituted benzoic acid ester compound having the formula:

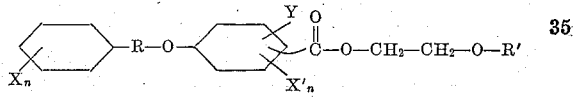

wherein X and X' each represents a member of the group consisting of halogen and hydrogen, each $n$ is an integer not greater than 2, R represents an alkylene radical, R' is a hydrocarbon group selected from the class consisting of the alkyl, aralkyl, cyclo-alkyl and aryl radicals, and Y represents a member of the group consisting of phenyl, methyl, and hydrogen.

2. An aralkyl ether of a hydroxy-substituted benzoic acid ester compound having the formula:

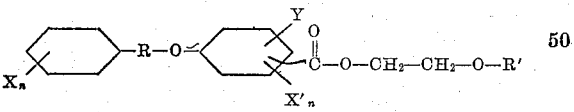

wherein X and X' each represents a member of the group consisting of halogen and hydrogen, each $n$ is an integer not greater than 2, R represents an alkylene radical containing from 1 to 8 carbon atoms, inclusive, R' is a hydrocarbon group selected from the class consisting of the alkyl, aralkyl, cyclo-alkyl and aryl radicals, and Y represents a member of the group consisting of phenyl, methyl, and hydrogen.

3. A benzyl ether of a hydroxy-substituted benzoic acid ester compound having the formula:

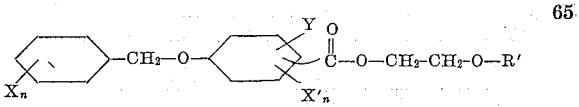

wherein X and X' each represents a member of the group consisting of halogen and hydrogen, each $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

4. A halo-benzyl ether of a hydroxy-substituted benzoic acid ester compound having the formula:

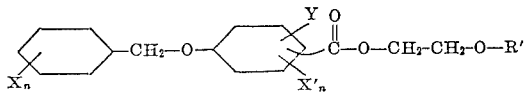

wherein X is halogen and X' represents a member of the group consisting of halogen and hydrogen, each $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

5. A benzyl ether of a hydroxy-substituted benzoic acid ester compound having the formula:

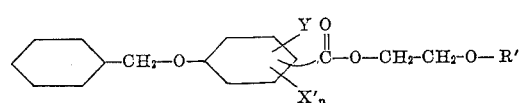

wherein X' represents a member of the group consisting of halogen and hydrogen, $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

6. An aralkyl ether of a hydroxy-substituted benzoic acid ester compound having the formula:

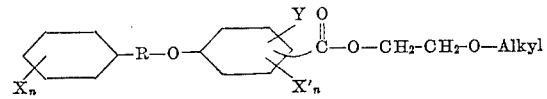

wherein X and X' each represents a member of the group consisting of halogen and hydrogen, each $n$ is an integer not greater than 2, R represents an alkylene radical, and Y represents a member of the group consisting of phenyl, methyl, and hydrogen.

7. An aralkyl ether of a hydroxy-substituted benzoic acid ester compound having the formula:

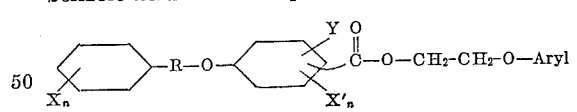

wherein X and X' each represents a member of the group consisting of halogen and hydrogen, each $n$ is an integer not greater than 2, R represents an alkylene radical, and Y represents a member of the group consisting of phenyl, methyl, and hydrogen.

8. An aralkyl ether of an organic salicylate compound having the formula:

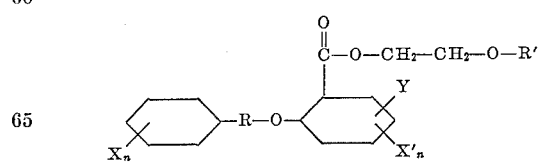

wherein X and X' each represents a member of the group consisting of halogen and hydrogen, each $n$ is an integer not greater than 2, R represents an alkylene radical, R' is a hydrocarbon group selected from the class consisting of the alkyl, aralkyl, cyclo-alkyl and aryl radicals, and Y represents a member of the group consisting of phenyl, methyl, and hydrogen.

9. An aralkyl ether of an organic salicylate compound having the formula:

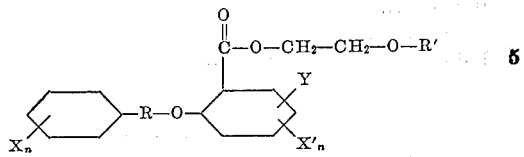

wherein X and X' each represents a member of the group consisting of halogen and hydrogen, each $n$ is an integer not greater than 2, R represents an alkylene radical containing from 1 to 8 carbon atoms, inclusive, R' is a hydrocarbon group selected from the class consisting of the alkyl, aralkyl, cyclo-alkyl and aryl radicals, and Y represents a member of the group consisting of phenyl, methyl, and hydrogen.

10. A benzyl ether of an organic salicylate compound having the formula:

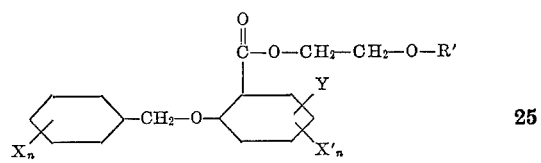

wherein X and X' each represents a member of the group consisting of halogen and hydrogen, each $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

11. A halo-benzyl ether of an organic salicylate compound having the formula:

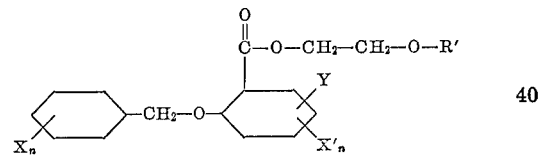

wherein X is halogen, X' represents a member of the group consisting of halogen and hydrogen, each $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

12. A benzyl ether of an organic salicylate compound having the formula:

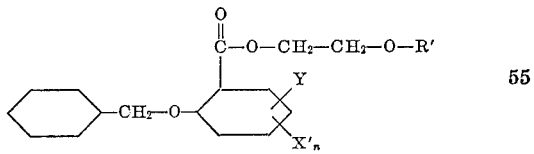

wherein X' represents a member of the group consisting of halogen and hydrogen, $n$ is an integer not greater than 2, R' is a hydrocarbon group selected from the class consisting of the alkyl, aralkyl, cyclo-alkyl and aryl radicals, and Y represents a member of the group consisting of phenyl, methyl, and hydrogen.

13. A benzyl ether of an organic salicylate compound having the formula:

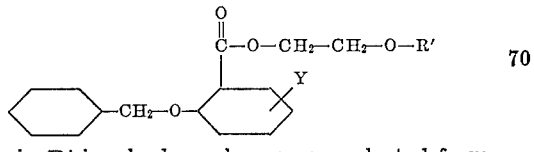

wherein R' is a hydrocarbon group selected from the class consisting of the alkyl, aralkyl, cyclo-alkyl and aryl radicals, and Y represents a member of the group consisting of phenyl, methyl, and hydrogen.

14. A benzyl ether of an organic salicylate compound having the formula

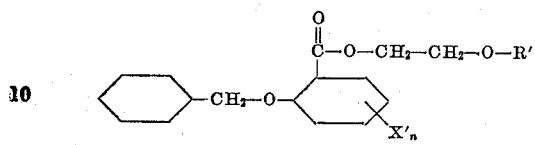

wherein X' is a member of the group consisting of halogen and hydrogen, $n$ is an integer not greater than 2, and R' is a hydrocarbon group selected from the class consisting of the alkyl, aralkyl, cyclo-alkyl and aryl radicals.

15. A benzyl ether of a beta-alkoxy-ethyl salicylate having the formula

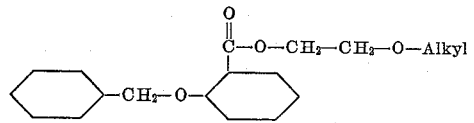

16. Benzyl ether of beta-ethoxy-ethyl salicylate.
17. Benzyl ether of beta-butoxy-ethyl salicylate.

EDWARD M. VAN DUZEE.
SHAILER L. BASS.